June 27, 1939.　　　　J. C. MARIS　　　　2,163,887

LOCOMOTIVE TRUCK

Filed March 27, 1937　　　　2 Sheets-Sheet 1

INVENTOR
James C. Maris
BY
ATTORNEY

June 27, 1939.   J. C. MARIS   2,163,887
LOCOMOTIVE TRUCK
Filed March 27, 1937   2 Sheets-Sheet 2

INVENTOR
JAMES C. MARIS
BY
ATTORNEY

Patented June 27, 1939

2,163,887

UNITED STATES PATENT OFFICE 2,163,887

LOCOMOTIVE TRUCK

James C. Maris, Glenolden, Pa.

Application March 27, 1937, Serial No. 133,405

3 Claims. (Cl. 105—194)

This invention relates generally to railway trucks and more particularly to a high heavy duty four wheel locomotive truck.

The present trend is toward locomotives of large power capacity which necessarily involves a very heavy construction. This condition is further aggravated by the fact that with modern high speed locomotives it is essential that the truck be provided with clasp brakes and also that the spring arrangement be rugged and yet as flexible as possible.

To carry heavy loads on a truck, necessarily requires large journal bearings which occupy considerable space regardless of whether the bearing is of the inboard or of the outboard type. In some instances, the space occupied by an outside journal bearing is needed for the guides and crossheads of the locomotive with the result that any attempt to utilize outside journal bearings under such circumstances results in clearances that are entirely too small for good practice.

It is an object of my invention to provide an improved high speed heavy duty truck that will have ample bearing capacity without unduly minimizing essential clearances for other operating elements and will have ample space for utilization of clasp type brakes together with a rugged but flexible spring arrangement.

A further object is to accomplish the foregoing desirable characteristics in a truck so constructed and arranged that it is economical in manufacture, maintenance and operation and permits various parts to be readily accessible for inspection or repair as well as having the component parts formed in a rugged and compact manner.

Other objects and advantages will be more apparent to those skilled in the art from the following description of the accompanying drawings in which.

Figure 2:
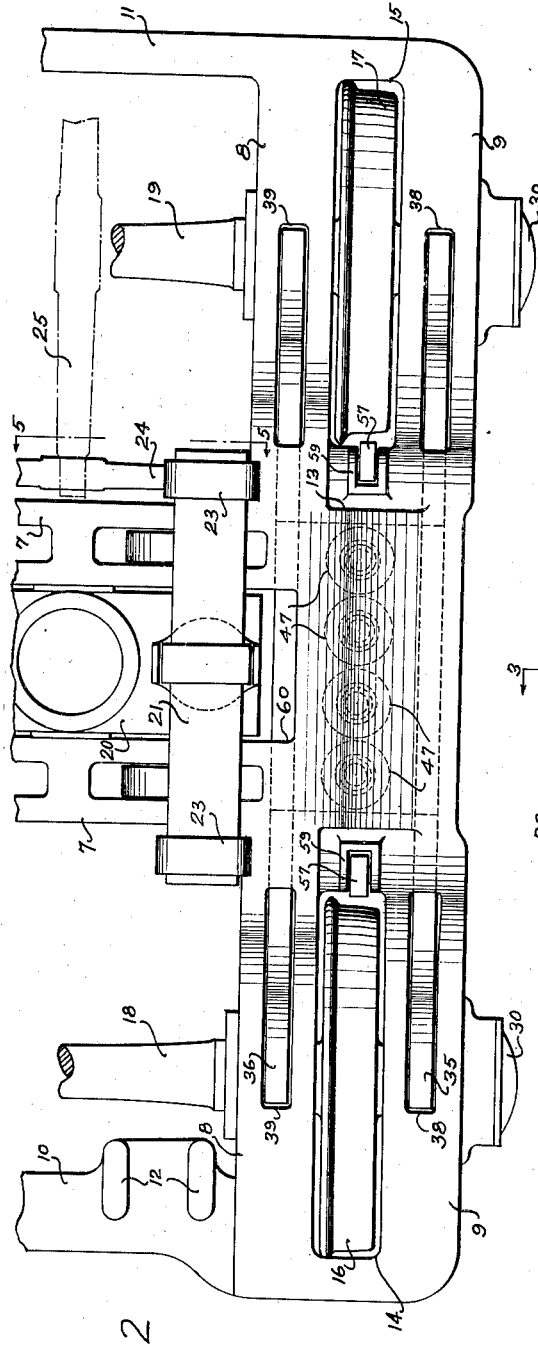
Fig. 2 is a plan view of Fig. 1 showing substantially one-half of the truck.

In the particular embodiment of the invention such as is disclosed herein merely for the purpose of illustrating one specific form among possible others that the invention might take in practice, I have provided as shown in Fig. 2 a usual cross transom 7 connected to a pair of wheel pieces 8 and 9. It will be understood that the truck is symmetrical about its longitudinal center line, and hence the description of one side will suffice for both. Thus it is seen that there are two pairs of wheel pieces 8 and 9, one pair for each side of the truck. End pieces 10 and 11 function as is usual in truck practice, although the end piece 10 has brake cylinder pads 12 formed integrally therewith. The truck as described so far is preferably of the integral cast steel type although it will be apparent that other designs of trucks may be employed in carrying out the principles of my invention. The pairs of wheel pieces merge into a common structure formed by a portion 13, of cross transom 7, overlying the wheel pieces, thereby rigidly spacing the wheel pieces 8 and 9 to provide suitable vertical openings 14 and 15 in which wheels 16 and 17, mounted respectively upon axles 18 and 19, are received. A usual swing bolster 20 is supported between the cross transom 7 in any customary manner while main springs 21, supported upon the swing bolster, in turn support a locomotive frame or superstructure 22 on the ends of the springs through hangers 23 and a cross equalizing beam 24, Fig. 2. A usual longitudinal equalizing beam 25 is supported on cross beam 24, but further description of the bolster is not deemed necessary at it per se does not constitute a part of my present invention, although the twin springs 21 mounted on the swing bolster and operatively connected to the locomotive frame 22 and cross equalizing beam 24 do constitute a part of my improved truck.

Figure 1:
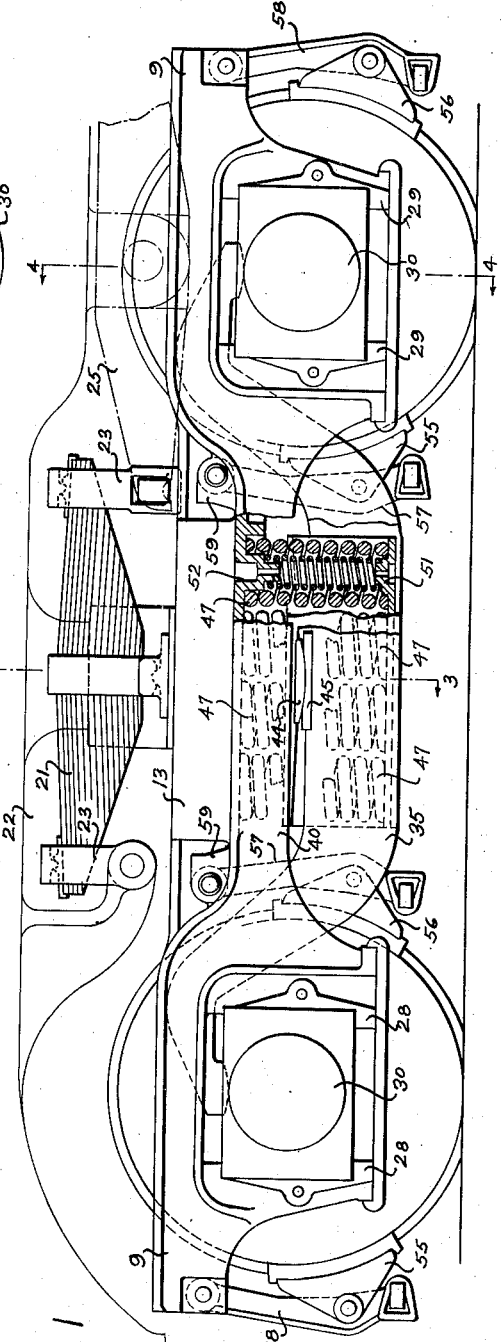
Fig. 1 is a side elevation of my improved truck.
Figure 4:
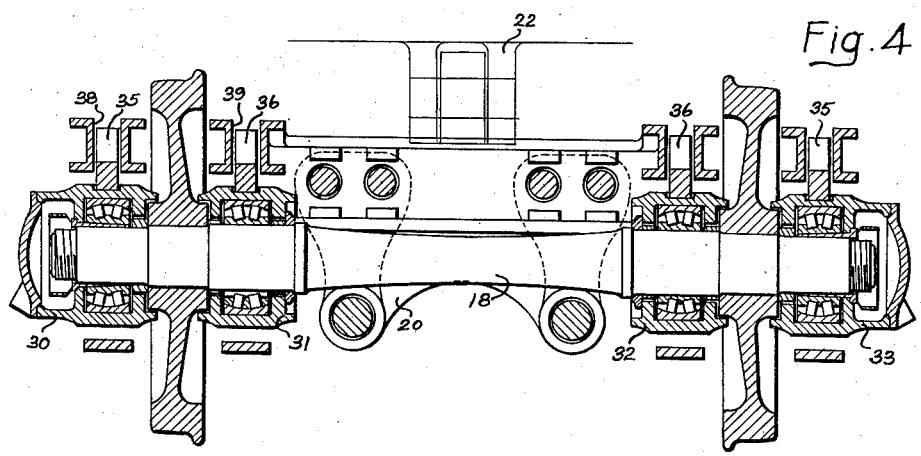
Fig. 4 is a transverse section taken substantially on the line 4—4 of Fig. 1.
Figures 5, 6:
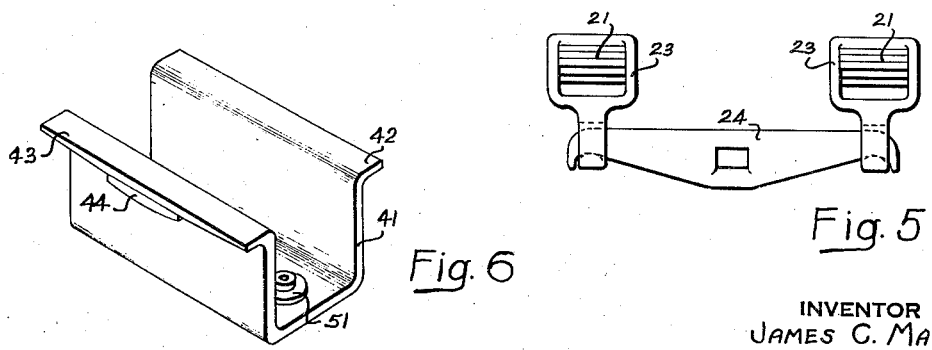
Fig. 5 is an end view of the main spring and equalizing arrangement taken substantially on the line 5—5 of Fig. 2.
Fig. 6 is a perspective of one of the coil spring supports.

Each of the wheel pieces 8 and 9 has pedestal guides, the pedestals for the outside wheel piece 9 being shown in Fig. 1 at 28 and 29. The pedestals for the inner wheel piece 8 would be similar to 28 and 29, and hence are not shown. Each axle has journal boxes shown in Fig. 4 at 30, 31, 32 and 33, suitably guided in the pedestals. While these journals are disclosed as of the roller bearing type, yet it will be apparent that other standard forms of journal boxes can be employed. The outboard journal 30 of axle 18 and the corresponding outboard journal 30 of the other axle 19 (Fig. 1) are connected by a main longitudinal equalizing beam 35 having its ends extending upwardly to rest on top of the journal boxes. Similarly the inboard bearings 31 of axles 18 and 19 are connected by a longitudinal equalizing beam 36, Figs. 2 and 4. The journal sets 32 and 33 on the other side of the truck are connected by equalizing beams which are given the same reference numbers 35 and 36. Suitable vertical openings 38 and 39 are provided, Fig. 2, in the wheel pieces 8 and 9 for the equalizing beams 35 and 36 respectively. The intermediate portion of the equalizing beam extends well below the intermediately depressed portion 40 of wheel pieces 8 and 9, Fig. 1. One part of my improved spring arrangement is interposed between these two depressed portions as will be now described.

Figure 3:
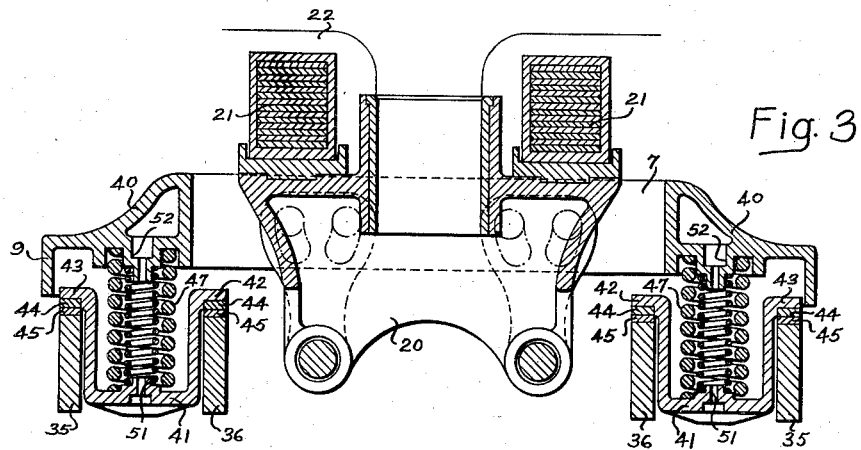
Fig. 3 is a transverse section taken substantially on the line 3—3 of Fig. 1.

As shown in Fig. 3 and again considering only one side of the truck, the equalizing beams 35 and 36 are spanned by a U-shaped spring support or cradle 41 having lateral flanges 42 and 43 resting respectively on the equalizing beams 35 and 36. To permit rocking movement of the spring support relative to the equalizing beams or vice versa, arcuate bearing members 44 are secured in the under side of flanges 42 and 43, these members 44 resting in arcuate seats of members 45 suitably secured in the top edge of the equalizing beams 35 and 36. A series of vertical preferably coiled springs 47, or other equivalent springs, are spaced at longitudinal points between support 41 and the substantially horizontal transverse portion 40 connecting the pair of wheel pieces 8 and 9 at their central portion. If desired, inner and outer concentric coils may be employed to break up any harmonic vibration of the springs. Preferably small bosses 51 and 52 secured to or formed with the support and truck extend inwardly of the springs to hold them in position.

As a result of the foregoing construction and arrangement of parts, it is seen that ample room is provided not only for the springs 47 but also for a clasp brake generally indicated at 55 and 56, this brake having usual brake levers 57 and 58 which may be conveniently employed without undue crowding of the parts. The brake levers 57 are pivotally supported in bosses 59 between the wheel pieces 8 and 9. The operating mechanism for this type of brake is of course well known, and hence further detailed disclosure thereof is not necessary. Also, the brake and coil spring arrangement does not interfere with substantial lateral swinging of the bolster, this being facilitated by wheel pieces 8 merging with and terminating at cross transom 7 so as to provide a relatively large transverse opening 60, Fig. 2, in which swing bolster 20 may adequately move. The outside wheel piece 9 merges with the transom portion 13 but extends continuously across the same so as to greatly increase its strength while retaining maximum compactness.

From the foregoing description, it is seen that I have provided an extremely rugged heavy duty truck having ample journal bearing capacity by utilizing a combination of wheel pieces and longitudinal equalizing beams with both inboard and outboard bearings, these bearings being individually of considerably smaller axial dimension than would be required if a single bearing were used in place of the two bearings. This heavy duty characteristic of the truck is thus fully adapted for high speed service by reason of the flexible spring arrangement between the wheel pieces and the longitudinal equalizing beams without in any way restricting the main spring suspension and equalizing system nor in interfering in any way with the freedom of action of the swing type bolster. This is all accomplished in such a compact manner that ample room is provided for the clasp type brake which is also desirable for high speed operation. Thus I have provided what might be aptly termed a high speed duty flexible truck having maximum safety in both its construction and speed control. It is also obvious that due to the use of inboard and outboard bearings for each wheel that the central portion of each axle may be omitted whenever desired.

It will of course be understood that various changes in details of construction and arrangement of parts may be made by those skilled in the art without departing from the spirit of the invention as set forth in the appended claims.

I claim:

1. A railway truck comprising, in combination, a frame each side of which has a pair of spaced wheel pieces, a horizontal member transversely connecting one pair of said wheel pieces substantially at their central portion and another transverse member similarly connecting the other pair of wheel pieces, said transverse members providing spring supports, pedestals formed in said spaced wheel pieces, wheels disposed between each of said pairs of wheel pieces, a plurality of longitudinally spaced axles each of which has a pair of said wheels rigidly connected thereto, inboard and outboard journal boxes supported by each axle which carries a pair of said wheels, said journal boxes being guided in the pedestal guides of said wheel pieces, longitudinal equalizing beams between the outboard journal boxes of the longitudinally spaced wheels and longitudinal equalizing beams between the inboard journal boxes of said spaced wheels, springs disposed between said equalizing beams and said transverse connecting members, transoms connecting the two pairs of wheel pieces and having a bolster opening terminating at the inner edges of said transverse connecting members adjacent the vertical plane of the inner wheel pieces, and a swing bolster disposed in said bolster opening and supported by said transoms so as to transmit load first to said transverse connecting members and thence to the springs upon which said transverse connecting members are supported.

2. The combination in a truck comprising, a frame each side of which has a pair of spaced wheel pieces provided with pedestals, wheels disposed between each of said pairs of wheel pieces, a plurality of longitudinally spaced axles each of which has a pair of said wheels rigidly connected thereto, inboard and outboard journal boxes supported by each axle which carries a pair of said wheels, said journal boxes being guided in the pedestal guides of said pairs of wheel pieces, longitudinal equalizing beams between the outboard journal boxes of the longitudinally spaced wheels and other longitudinal equalizing beams between the inboard journal boxes of said spaced wheels, a U-shaped spring cradle supported by and depending between said equalizing beams, and spring means supported in the bottom of said cradle and reacting upwardly against said truck frame.

3. The combination in a truck comprising, a frame each side of which has a pair of spaced wheel pieces provided with pedestals, wheels disposed between each of said pairs of wheel pieces, a plurality of longitudinally spaced axles each of which has a pair of said wheels rigidly connected thereto, inboard and outboard journal boxes supported by each axle which carries a pair of said wheels, said journal boxes being guided in the pedestal guides of said pairs of wheel pieces, longitudinal equalizing beams between the outboard journal boxes of the longitudinally spaced wheels and other longitudinal equalizing beams between the inboard journal boxes of said spaced wheels, a U-shaped spring cradle supported by the upper edges of said equalizing beams and depending between the same, and a plurality of coil springs interposed between said truck frame and the bottom of said U-shaped cradle.

JAMES C. MARIS.